United States Patent
Xie

(10) Patent No.: US 10,747,988 B2
(45) Date of Patent: Aug. 18, 2020

(54) METHOD AND DEVICE FOR FACE TRACKING AND SMART TERMINAL

(71) Applicant: GOERTEK INC., Weifang (CN)

(72) Inventor: Fuli Xie, Weifang (CN)

(73) Assignee: GOERTEK INC, Shandong (CN)

( * ) Notice: Subject to any disclaimer, the term of this patent is extended or adjusted under 35 U.S.C. 154(b) by 167 days.

(21) Appl. No.: 16/068,953

(22) PCT Filed: Jan. 25, 2017

(86) PCT No.: PCT/CN2017/072545
§ 371 (c)(1),
(2) Date: Jul. 10, 2018

(87) PCT Pub. No.: WO2017/133605
PCT Pub. Date: Aug. 10, 2017

(65) Prior Publication Data
US 2019/0034700 A1    Jan. 31, 2019

(30) Foreign Application Priority Data
Feb. 3, 2016    (CN) .......................... 2016 1 0076493

(51) Int. Cl.
*G06K 9/00* (2006.01)
*G06T 7/246* (2017.01)
(Continued)

(52) U.S. Cl.
CPC ............ *G06K 9/00261* (2013.01); *G06T 7/13* (2017.01); *G06T 7/246* (2017.01); *G06T 7/74* (2017.01);
(Continued)

(58) Field of Classification Search
CPC ........... G06K 9/00261; G06K 9/00268; G06K 9/00288; G06K 9/00711; G06K 9/00221;
(Continued)

(56) References Cited

U.S. PATENT DOCUMENTS 6,580,810 B1 *   6/2003   Yang .................. G06K 9/00228
                                                          348/14.1
9,478,033 B1 *  10/2016   Safreed .................. H04N 19/54
(Continued)

FOREIGN PATENT DOCUMENTS

CN           101477690 A        7/2009
CN           102054159 A        5/2011
(Continued)

OTHER PUBLICATIONS

Office Action dated Sep. 5, 2018, by the Chinese Patent Office in corresponding Chinese Patent Application No. 201610076493.6. (6 pages).
(Continued)

*Primary Examiner* — Jose L Couso
(74) *Attorney, Agent, or Firm* — Buchanan Ingersoll & Rooney PC

(57) ABSTRACT

A method and device for face tracking and a smart terminal. The method includes: collecting a frame of an image in a video stream and conducting face detection and identification, to identify a target face; determining a position of a window to be tracked that contains the target face according to the identified target face, and extracting an edge feature point in the window to be tracked of the reference frame; determining an initial position of a window to be tracked on the current frame in the video stream, and extracting an edge feature point in the window to be tracked of the current frame; calculating a relative displacement between the edge feature point of the reference frame and the edge feature point of the current frame; and adjusting the initial position of the window to be tracked of the current frame by using the relative displacement.

17 Claims, 3 Drawing Sheets

(51) Int. Cl.
*G06T 7/73* (2017.01)
*G06T 7/13* (2017.01)
*H04W 88/02* (2009.01)

(52) U.S. Cl.
CPC ............ *G06T 2207/10016* (2013.01); *G06T 2207/30201* (2013.01); *H04W 88/02* (2013.01)

(58) Field of Classification Search
CPC .......... G06K 9/00281; G06K 9/00234; G06K 9/00248; G06K 9/00302; G06K 9/00335; G06K 9/00744; G06K 9/00765; G06K 9/46; G06K 9/52; G06K 9/00228; G06K 9/4671; G06K 9/6201; G06K 9/6202; G06T 2207/10016; G06T 2207/30201; G06T 2207/30196; G06T 7/74; G06T 7/246; G06T 7/13; G06T 7/11; G06T 7/33; G06T 7/73; G06T 7/20; G06T 7/248; G06T 7/38; G06T 7/579; G06T 7/215; H04W 88/02; G06F 16/784; B25J 11/0005; H04N 19/167; H04N 19/17; H04N 19/54
See application file for complete search history.

(56) References Cited

U.S. PATENT DOCUMENTS

| | | | | |
|---|---|---|---|---|
| 2003/0103647 A1* | 6/2003 | Rui | ................... | G06K 9/00234 382/103 |
| 2005/0058337 A1* | 3/2005 | Fujimura | ........... | G06K 9/00201 382/159 |
| 2008/0187175 A1* | 8/2008 | Kim | ................... | G06K 9/00268 382/103 |
| 2012/0321134 A1* | 12/2012 | Shen | ................... | G06K 9/00208 382/103 |
| 2013/0070973 A1* | 3/2013 | Saito | ................... | G06K 9/00228 382/118 |
| 2013/0243274 A1* | 9/2013 | Sukegawa | .......... | G06K 9/00221 382/118 |
| 2013/0314437 A1* | 11/2013 | Fujiwara | ................ | G06K 9/621 345/629 |
| 2016/0034748 A1* | 2/2016 | Wang | ................. | G06K 9/00281 382/201 |
| 2018/0096537 A1* | 4/2018 | Kornilov | ................. | G06T 19/20 |
| 2018/0137892 A1* | 5/2018 | Ding | ................. | G06K 9/00744 |
| 2018/0181813 A1* | 6/2018 | Sun | .................... | G06K 9/00711 |

FOREIGN PATENT DOCUMENTS

| | | | | |
|---|---|---|---|---|
| CN | 103093212 A | | 5/2013 | |
| CN | 103514441 | | 1/2014 | |
| CN | 103646406 A | | 3/2014 | |
| CN | 104866805 A | * | 8/2015 | .............. G06K 9/00 |
| CN | 104866805 A | | 8/2015 | |
| CN | 105069408 A | | 11/2015 | |
| CN | 105760826 A | | 7/2016 | |

OTHER PUBLICATIONS

International Search Report (PCT/ISA/210) dated Apr. 26, 2017, by the Chinese Patent Office as the International Searching Authority for International Application No. PCT/CN2017/072545.

Written Opinion (PCT/ISA/237) dated Apr. 26, 2017, by the Chinese Patent Office as the International Searching Authority for International Application No. PCT/CN2017/072545.

Office Action dated Nov. 28, 2019, by the Chinese Patent Office in corresponding Chinese Patent Application No. 261610676493.6, with English Transiation (12 pages).

* cited by examiner

METHOD AND DEVICE FOR FACE TRACKING AND SMART TERMINAL

CROSS REFERENCE TO RELATED APPLICATIONS

This application is a National Stage entry of International Application No. PCT/CN2017/072542, filed on Jan. 25, 2017, which claims priority to Chinese Patent Application No. 201610079350.0, filed on Feb. 3, 2016. The entire contents of each of which are incorporated herein by reference.

TECHNICAL FIELD

The present disclosure relates to the technical field of computer vision, and particularly relates to a method and device for face tracking and a smart terminal.

BACKGROUND

Face tracking is the process of determining the movement trajectory of a target face based on face identification. Face identification generally includes two parts: the first is to conduct face detection with respect to the image, and the second is to conduct particular face judging with respect to the detected face region. In other words, first, a face is detected in an inputted image, and then the detected face is compared with samples in a face database to identify the target face. After the target face is identified, how to conduct effective tracking of the movement trajectory of the face is a problem to be solved in face tracking.

In the prior art, Camshift (Continuously Adaptive Mean Shift) algorithm based on skin color feature is extensively used in face tracking. The Camshift algorithm is an improvement of MeanShift algorithm, and its basic idea is to conduct MeanShift calculation with respect to all frames of a video image, use the calculating result of the preceding frame (namely, the center and size of the searching window) as the initial value of the searching window of the next frame of MeanShift algorithm, and repeat the iteration. The Camshift algorithm can self-adaptively adjust the position and size of the searching window according to the tracking result of the current frame and realize real-time face tracking.

However, the Camshift algorithm uses the skin color model to track, relies heavily on factors such as the environment and the background, has a poor anti-interference ability and low tracking accuracy.

SUMMARY

The present disclosure provides a method and device for face tracking and a smart terminal, to solve the problem of low tracking accuracy in the existing face tracking algorithms.

According to an aspect of the present disclosure, there is provided a method for face tracking, comprising:

collecting a frame of image in a video stream as a reference frame and conducting face detection and face identification with respect to the reference frame, to identify out a target face;

determining a position of a window to be tracked that contains the target face in the reference frame according to the identified target face, and extracting an edge feature point in the window to be tracked of the reference frame;

determining an initial position of a window to be tracked on a current frame image in the video stream according to the position of the window to be tracked of the reference frame, and extracting an edge feature point in the window to be tracked of the current frame;

calculating a relative displacement between the edge feature point of the reference frame and the edge feature point of the current frame; and adjusting the initial position of the window to be tracked of the current frame by using the relative displacement, and obtaining a movement trajectory of the target face in the video stream, to realize face tracking.

According to another aspect of the present disclosure, there is provided a device for face tracking, comprising:

a face identifying module, for collecting a frame of image in a video stream as a reference frame and conducting face detection and face identification with respect to the reference frame, to identify out a target face;

a reference frame window position determining module, for determining a position of a window to be tracked that contains the target face in the reference frame according to the identified target face, and extracting an edge feature point in the window to be tracked of the reference frame;

a current frame window position determining module, for determining an initial position of a window to be tracked on a current frame image in the video stream according to the position of the window to be tracked of the reference frame, and extracting an edge feature point in the window to be tracked of the current frame;

a relative displacement calculating module, for calculating a relative displacement between the edge feature point of the reference frame and the edge feature point of the current frame; and a face tracking module, for adjusting the initial position of the window to be tracked of the current frame by using the relative displacement, and obtaining a movement trajectory of the target face in the video stream, to realize face tracking.

According to yet another aspect of the present disclosure, there is provided a smart terminal comprising the device for face tracking according to the another aspect of the present disclosure; and the smart terminal detects a face movement state by using the device for face tracking, and the smart terminal self-adaptively adjusts positions of at least part of movable components or functions executed by at least part of components according to the detected face movement state.

The advantageous effects of the present disclosure are as follows. Compared with the prior art such as the existing Camshift algorithm based on skin color model, the method and device for face tracking according to the present disclosure conducts tracking based on the displacement of the edge feature point of the identified target face, and determines the regions of the target face in the next frame image by using the information of the movement feature (namely, displacement) of the edge feature points distributed in the target face, to reduce the influence on face tracking and detecting by the movement of the target face to be tracked and noise, thereby improving the correctness and tracking accuracy of the face tracking. In addition, the present disclosure further provides a smart terminal, and the smart terminal detects a face movement state by using the device for face tracking, and self-adaptively adjusts positions of at least part of movable components or functions executed by at least part of components according to the detected face movement state. The present disclosure can realize uninterrupted tracking with respect to the same target face, and improve the user experience and competitiveness of the product.

DETAILED DESCRIPTION

The technical solutions in the embodiments of the present disclosure will be clearly and fully described below with reference to the accompanying drawings in the embodiments of the present disclosure. Obviously, the described embodiments are merely part of the embodiments of the present disclosure, rather than all of them. All other embodiments obtained on the basis of the embodiments of the present disclosure by a person skilled in the art without paying creative work shall fall within the protection scope of the present disclosure.

First Embodiment

Figure 1:
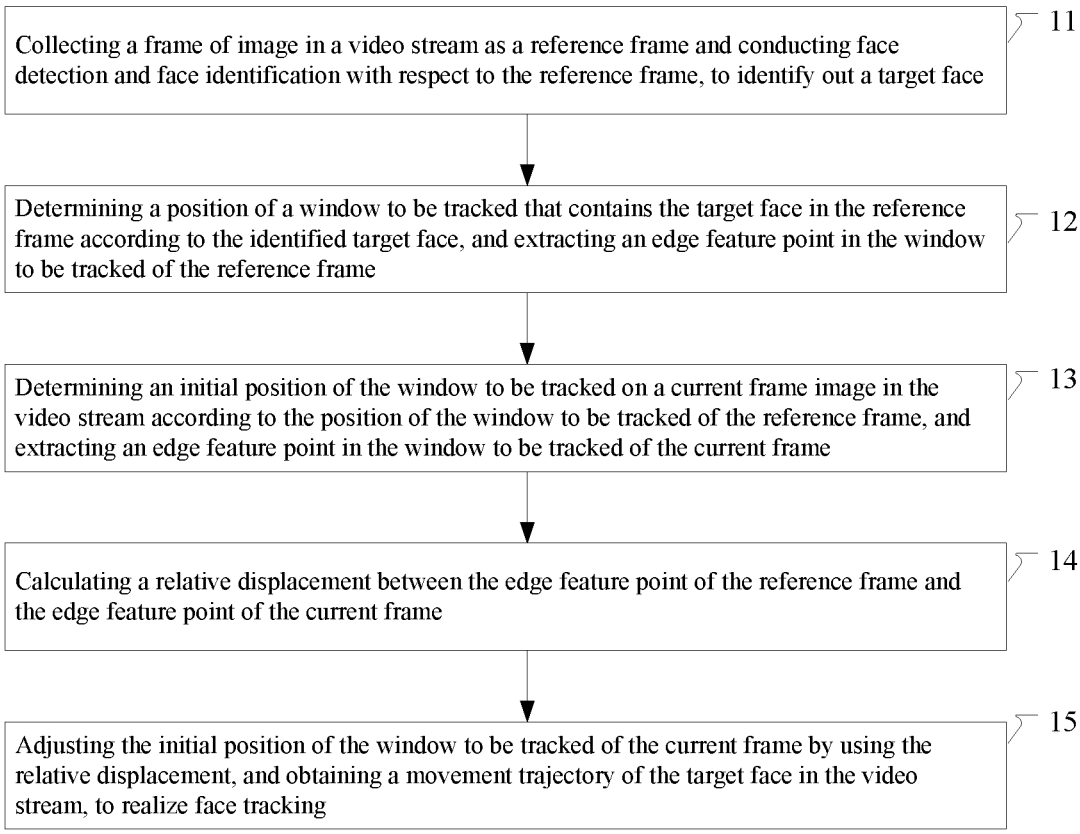
FIG. 1 is a schematic flow chart of a method for face tracking according to an embodiment of the present disclosure.

FIG. 1 is a schematic flow chart of a method for face tracking according to an embodiment of the present disclosure. Referring to FIG. 1, the method for face tracking comprises the following Steps 11 to 15:

Step 11, collecting a frame of image in a video stream as a reference frame and conducting face detection and face identification with respect to the reference frame, to identify out a target face.

Step 12, determining a position of a window to be tracked that contains the target face in the reference frame according to the identified target face, and extracting an edge feature point in the window to be tracked of the reference frame.

Step 13, determining an initial position of a window to be tracked on a current frame image in the video stream according to the position of the window to be tracked of the reference frame, and extracting an edge feature point in the window to be tracked of the current frame.

Here, the reference frame refers to a frame selected from the video stream, and the current frame refers to a frame that follows the reference frame and is as adjacent to it as possible in time. Furthermore, in the present embodiment, the images in the video stream need to satisfy the precondition of calculating (for example, the image background does not change, the light is stable, and the displacement of the edge feature points of two neighboring frames is far less than the image size) to ensure the translation movement of the images, and the initial position of the window to be tracked in the current frame and the position of the window to be tracked in the reference frame are the same. Thereby, after the position of the window to be tracked in the reference frame is determined, the initial position of the window to be tracked in the current frame can be determined according to this position.

Step 14, calculating a relative displacement between the edge feature point of the reference frame and the edge feature point of the current frame. Here, the relative displacement refers to the movement amount of the edge feature point in the space. The relative displacement may be obtained by, for example, projecting each of the edge feature points of the target face to a plane parallel to the target face respectively, establishing a corresponding plane coordinate system comprising four regions according to the windows to be tracked of the current frame and the reference frame, projecting the edge feature points in the window to be tracked to the plane coordinate system, obtaining horizontal and vertical coordinate values corresponding to each of the edge feature points, and obtaining the relative displacement by using the difference value between the coordinates of the edge feature point of the reference frame and the coordinates of the edge feature point of the current frame.

Step 15, adjusting the initial position of the window to be tracked of the current frame by using the relative displacement, and obtaining a movement trajectory of the target face in the video stream, to realize face tracking.

It can be known from FIG. 1 that, the method for face tracking of the present embodiment, determines the position of the window to be tracked in the current frame based on the position of the window to be tracked in the reference frame, and adjusts the position of the window to be tracked of the current frame based on the displacement of the edge feature points of the target face in two frames of images, to reduce the influence on face tracking and detecting by the movement of the target face to be tracked and noise, thereby improving the correctness and tracking accuracy of the face tracking.

Face tracking techniques have been increasingly applied to smart terminals, but presently the practical applications of face tracking on smart terminals still have the following problems:

(1) How to overcome the influences by face expressions, ambient light and image set variation, to extract effective features to describe the face?

(2) How to accurately track when the target is quickly moving? The angle of face will change in varying degrees when it is moving. Inclining leftward and rightward or turning forward and backward will also bring the change of face expression to a certain degree. The moving forward and backward of the person will also bring the change of face size in the picture. How to overcome these changes, to position and track the face accurately?(3) How to determine the movement state of the target by using the tracked face? The face in the video stream is always in the movement state. How to determine the movement state of the user by using the extracted face information is one of the problems that must be solved in the field of human machine interaction or human computer interaction.

The technical means adopted by the present disclosure to solve the above technical problems are particularly described below by referring to other embodiments of the present disclosure.

Second Embodiment

Figure 2:
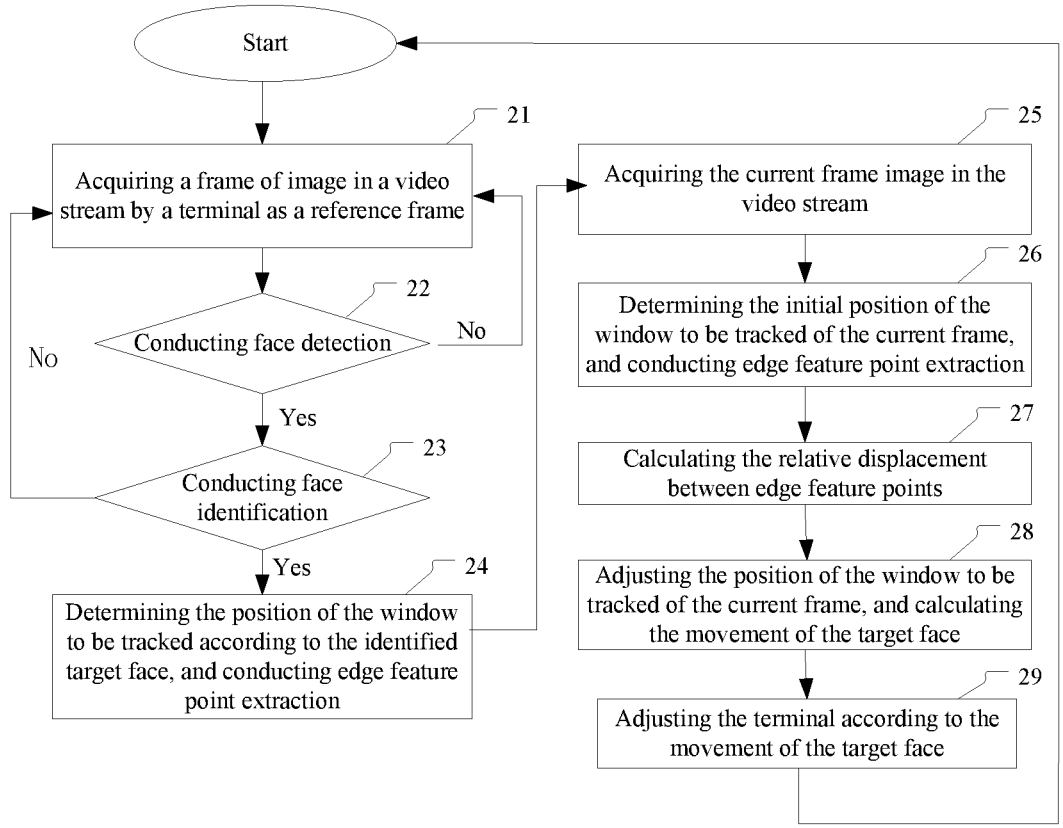
FIG. 2 is a flow chart for implementing a face tracking application according to another embodiment of the present disclosure.

FIG. 2 is a flow chart for implementing a face tracking application according to another embodiment of the present disclosure. Referring to FIG. 2, in the present embodiment, the method for face tracking is applied to a smart terminal, so that the smart terminal can detect and identify the target face, and track the identified target face in real time. In the present embodiment, a frame of image in the video stream is intercepted, the image is scanned and detected by using Cascade algorithm, then face features are extracted by conducting Gabor wavelet transformation with respect to the detected face region, subsequently pattern matching and identifying are conducted by using a support vector machine (SVM), and when a determined target is matched, the determined target is tracked by using a tracking algorithm based on feature point displacement. In other words, the flow of the face tracking in the present embodiment is roughly as follows: first, scanning and detecting a face by using Cascade algorithm; second, according to the detected face region, extracting face features by using Gabor wavelet transformation; finally, identifying and comparing the extracted face features by using SVM. If the comparing is successful, the target face can be tracked. It is particularly described below.

In Step 21, after the flow starts, a (smart) terminal acquires a frame of image in a video stream as a reference frame.

Here, a video collecting device is installed in the smart terminal so that images can be collected in real time to obtain a video stream. A frame of image (generally, a color image) is selected from the video stream as the reference frame, the selected frame of color image is converted into a grayscale image, and then the Haar-like feature value of the grayscale image is extracted. When extracting the Haar-like feature value of the grayscale image, in the present embodiment, a simple rectangle combination is used as the feature template which includes two types of rectangles: white and black, and the feature value of the template is defined as the result obtained by subtracting the sum of the pixel points of the black rectangles from the sum of the pixel points of the white rectangles.

In addition, in order to improve the calculation speed, the integral image method may be used. Extracting the Haar-like features by using an integral image may use the prior art, and the specific operation steps may be referred to relevant description in the prior art and are not repeated here.

In Step 22, face detection is conducted.

The face detection aims to correctly find and mark the accurate position of the face in images or videos, and is an important precondition for tasks such as face identification and tracking.

Images are highly complicated, so usually it is impossible to obtain an accurate detection result merely using a single type of feature information, and a plurality of types of feature information must be used to conduct the detection. Therefore, the present embodiment uses a method that combines Cascade algorithm and skin color distinguishing to conduct face detection. The Cascade algorithm is based on Haar-like features (namely, rectangle features), and the Haar-like features are selected and distinguished by a cascade classifier using Adaboost algorithm. In other words, in the present embodiment, conducting face detection with respect to the reference frame image comprises: selecting the Haar-like feature values of the grayscale image by using an Adaboost cascade classifier that has been trained, and detecting the grayscale image by using the selected Haar-like feature values to obtain an initial face region. The Adaboost detection algorithm based on the Haar-like features has relatively low requirement on the system itself, and has a high calculation speed.

In addition, by further reducing the false detecting rate and improving the accuracy of face tracking, skin color distinguishing may be conducted with respect to the detected initial face region by using a skin color model established in advance, to obtain a standard face region.

In Step 23, face identification is conducted.

After the face detection of the images is completed, the face obtained by detection must be compared and identified to confirm whether it is the target face. The face identification mainly comprises two parts: feature extraction and classification. The present embodiment uses Gabor wavelet transformation to extract face features, and uses SVM feature vector machine to conduct the classification.

Particularly, face features are extracted from the standard face region obtained in Step 22 by using a preset Gabor filter, and then the face features extracted by the Gabor filter are sent to an SVM that has been trained to conduct matching and identifying, to identify the target face.

The Gabor wavelet transformation may describe the face features by using 40 groups of feature values in total in 8 directions (5 frequencies in each of the 8 directions). Then, matching and identifying are conducted to the extracted Gabor features by using SVM. Next, edge feature points (for example, feature points such as the corner of eye, the nose bridge, and the corner of mouth of the face region) may be extracted from the face region that is successfully matched by SVM, and the positions of these feature points are tracked. Compared with traditional face identification techniques, the Gabor wavelet transformation in the present embodiment selects 40 image texture information in total (5 different frequencies in each of 8 different directions), which describes the image texture features more comprehensively, and can effectively eliminate the influence on face identification by factors such as light and face expressions.

Then, face tracking is conducted.

In the present embodiment, the face tracking comprises: Step 24, determining the position of the window to be tracked according to the identified target face, and conducting edge feature point extraction; Step 25, acquiring the current frame image in the video stream; Step 26, determining the initial position of the window to be tracked of the current frame, and conducting edge feature point extraction; and Step 27, calculating the relative displacement between edge feature points. The flow of face tracking is particularly described below by referring to Step 24 to Step 27.

The window to be tracked in Step 24 and Step 26 is defined by the target face that is identified in the face identification step of Step 23, and particularly, the window to be tracked is a rectangular box that contains the standard face region.

The face tracking is implemented by calculating the position of the window to be tracked in the next frame by using the SSD (Sum of Squared intensity Differences) of two frames of images. Here, the next frame is the second frame of two frames, and the two frames of images are not two random frames, but two frames that satisfy the precondition of calculating (for example, the image background does not change, the light is stable, and the displacement of the edge feature points of two neighboring frames should be far less than the image scale) and are as adjacent as possible in time.

Particularly, the face tracking algorithm based on edge feature points refers to a tracking algorithm that uses the SSD between the video image frames of the window to be tracked W (W comprises the identified face) as the measurement. The edge feature points refer to the pixel points corresponding to the edge features of the face (such as the corner of eye and the corner of mouth), and the pixel points corresponding to these features may have pixel value sudden change between two frames of images.

It should be noted that, the face tracking of the present embodiment in which the displacement is determined based on the SSD of two frames of images must ensure that, brightness keeps constant, time is continuous or movement amplitude is small, space is consistent, and neighboring points have similar movements and keep adjacent. By satisfying the above preconditions, it can be ensured that the calculating process is not affected by brightness variation. An affine transformation is conducted between the windows to be tracked. Generally, in the process, it is assumed that the coordinate offset amounts, expressed by the offset variable d, of all of the edge feature points in the window to be tracked are equal. Therefore, in the present embodiment, the movement between two frames of images is translation movement, and it may be not suitable for cases in which the movement features of the feature points are different, such as image overturn, folding and twisting.

Regarding a grayscale image, the positions in t moment image frame I(x, y, t) and in t+τ moment image frame I(x, y, t+τ) of a window to be tracked W that contains a feature texture information (namely, edge feature) satisfy the following formula:

$$I(x,y,t+\tau)=I(x-\Delta x,y-\Delta y,t) \quad \text{Formula 2.1}$$

In other words, each of the pixel points in I(x, y, t+τ) can be obtained by translating the pixel point of the corresponding window in I(x, y, t) by d=(Δx, Δy). After obtaining the displacement d, the tracking of a particular target between two frames of images can be realized.

It is assumed that the window to be tracked at the moment t+τ is B(X)=B(x, y, t+τ), where X=(x, y) is the viewport coordinate, and the window to be tracked at the moment t is A(X-d)=A(x-Δx, y-Δy, t). In general cases, $$B(X)=A(X-d)+n(X) \quad \text{Formula 2.2}$$

where n(X) is the noise generated within the duration τ due to the variation of light condition. By squaring n(X) and integrating over the whole window, the SSD of the window image is obtained:

$$\varepsilon=\iint_v n(X)^2 \omega(X)dX=\iint_v [A(X-d)-B(X)]^2 \omega(X)dX \quad \text{Formula 2.3}$$

where X=[x,y]T, d=[dx, dy]T, and ω(X) is typically 1. If the function of the feature point of the middle part is to be emphasized, ω(X) may use the Gaussian distribution function. When d is a small quantity that is negligible compared with X, Taylor expansion is conducted with respect to A(X-d), the high-order terms is removed, and only the first item of the expansion items is retained to reduce the calculating amount, and the following formula is obtained:

$$A(X-d)=A(X)-g \cdot d \quad \text{Formula 2.4}$$

By substituting Formula 2.4 into Formula 2.3, taking a derivative of the two sides of Formula 2.3 simultaneously with respect to d and taking zero, the following can be obtained:

$$\frac{\partial \varepsilon}{\partial d} = \iint_v [A(X)-B(X)-g^T d] \times g\omega(X)dX = 0 \quad \text{Formula 2.5}$$

At this point ε takes the minimal value, and Formula 2.5 can transform to the following Formula 2.6:

$$\left(\iint_v g g^T \omega dX\right)d = \iint_v [A(X)-B(X)]g\omega dX \quad \text{Formula 2.6}$$

If setting $$Z = \iint_v g(X)g^T(X)dX =$$

$$\iint_v \begin{bmatrix} g_x^2 & g_x g_y \\ g_x g_y & g_y^2 \end{bmatrix} \omega(X)dX = \begin{bmatrix} G_{xx} & G_{xy} \\ G_{xy} & G_{yy} \end{bmatrix}$$

$$e = \iint_v [A(X)-B(X)]g(X)\omega(X)dX,$$

Formula 2.6 can be abbreviated into: Zd=e.

Regarding each two frames of images, by solving the above formula Zd=e, the relative displacement of the edge feature point in the window to be tracked d=(Δx, Δy) can be obtained.

By now, the relative displacement d of the edge feature point is obtained, and then by adjusting the position of the window to be tracked in the next frame according to the relative displacement, the movement trajectory of the target face can be obtained, to realize face tracking.

It can be known from the above that, according to the face tracking of the present embodiment, a frame of image in the video stream is selected as the reference frame, and it is scanned and detected by using Cascade algorithm, then face features are extracted by conducting Gabor wavelet transformation with respect to the detected face region, subsequently pattern matching and identifying are conducted by using SVM, and when the determined target face is matched, the position of the window to be tracked in the current frame is determined by using a tracking algorithm based on the displacement of the edge feature point, to realize the tracking of the target face. Thereby, the influences by face expressions, ambient light and image set variation are overcome, and the effective edge features are extracted to describe the face, which improves the accuracy of face tracking.

Third Embodiment

In the practical tracking process, regarding the accurate tracking when the target is quickly moving, the angle of face will change in varying degrees when it is moving, inclining leftward and rightward or turning forward and backward will bring the change of face expression to a certain degree, and the forward and backward moving of the person will also bring the change of the face size in the picture. In case that the edge feature points are blocked, the system may misidentify similar edge feature points as the feature point, which results in incorrect tracking or failed tracking. In order to solve the problem, an embodiment of the present disclosure adopts anticlockwise inverse tracking to verify the accuracy of the tracking. The inverse verification of the face tracking is emphatically described below by referring to the present embodiment, and other contents may be referred to other embodiments of the present disclosure.

Figure 3:
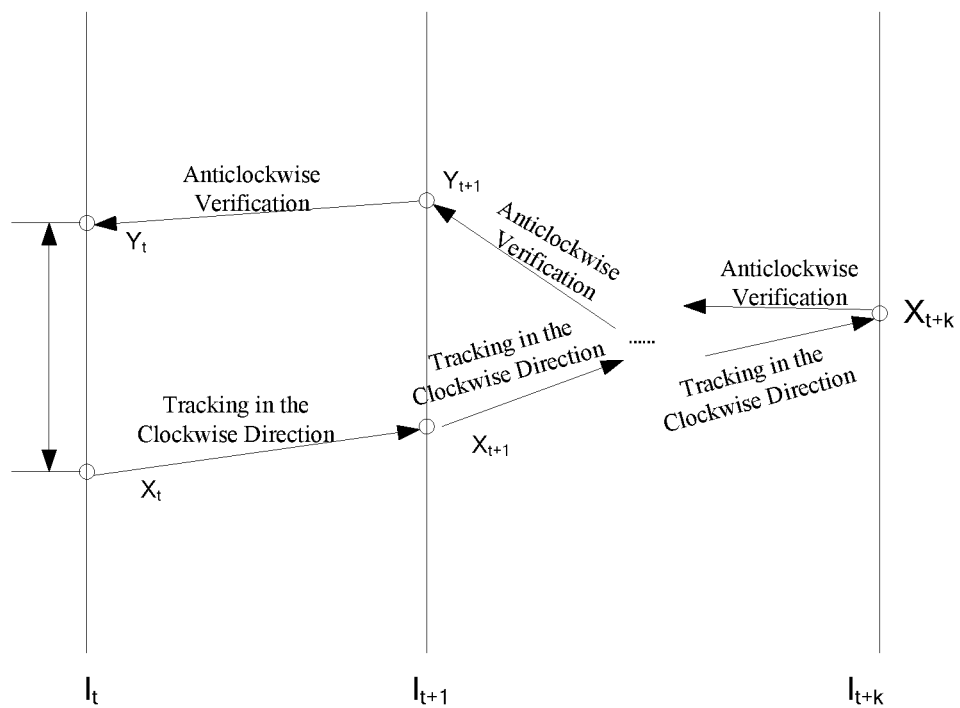
FIG. 3 is a schematic diagram of the principle of inverse tracking and verifying according to an embodiment of the present disclosure.

FIG. 3 is a schematic diagram of the principle of the inverse tracking and verifying according to an embodiment of the present disclosure. In the present embodiment, each of edge feature points in the window to be tracked that has been adjusted of the current frame is verified; when the verifying succeeds, it is confirmed that this edge feature point is successfully tracked in the current frame, and the edge feature point will be continuously tracked in subsequent tracking process; when the verifying fails, it is confirmed that this tracking of the edge feature point in the current frame fails, the edge feature point is abandoned, and the edge feature point will no longer be tracked.

FIG. 3 shows the case of incorrect tracking. In the process of face tracking, the images in the video stream are arranged in the clockwise direction, namely, tracked from the preceding frame to the current frame, and tracked from the current frame to the next frame. However, in anticlockwise verification, the images in the video stream are equivalent to being arranged in the anticlockwise direction, and thus the first frame in the anticlockwise verification may be the last frame that is tracked in the clockwise direction. In the inverse tracking and verifying, regarding an edge feature point $X_{t+k}$ in an image $I_{t+k}$ (the current frame) at the moment t+k (k>1) that is tracked in the clockwise direction, it is tracked backward to the image $I_{t+1}$ at the moment t+1, then continuously tracked backward to the moment t (the reference frame), and the position $Y_t$ corresponding to the edge feature point $X_{t+k}$ at the moment t is calculated out; if $Y_t$ and the position $X_t$ that was recorded at the moment t do not coincide (which indicates incorrect tracking), in the tracking process in the clockwise direction from the moment t+k to the next frame, the system abandoning this edge feature point and continuing the face tracking by using the edge feature points that have passed the verification. By conducting anticlockwise tracking, calculating and verification with respect to each of the edge feature points on $I_{t+k}$, all of the edge feature points indicating incorrect tracking can be judged. Experimental results confirm that, the anticlockwise verification can ensure the correctness of the face tracking.

In a particular implementation, it comprises: using a position of the edge feature point in the window to be tracked of the current frame as a verification starting position; determining the window to be tracked of the edge feature point in the reference frame, by using the verification starting position and the relative displacement between the edge feature points of the current frame and of the reference frame, and searching the edge feature point within the window to be tracked to obtain a position of the edge feature point in the reference frame; and comparing the position of the edge feature point in the reference frame which is obtained by verifying and the position of the edge feature point in the reference frame image which is acquired in advance, and if the comparison result is consistent, the verifying succeeds; and if the comparison result is not consistent, the verifying fails.

It can be known from the above that, in the process of face tracking, regarding the problem in the face movement that edge features may be blocked to result in incorrect tracking, the present disclosure, by verifying the edge feature points that is tracked and excluding in time the edge feature points that have incorrect tracking, ensures to conduct the subsequent tracking in the clockwise direction using the edge feature points that are correctly tracked, overcomes the problem of failed tracking resulted by misjudgment of the edge feature points, and further improves the accuracy of face tracking.

Fourth Embodiment

In the method for face tracking based on the displacement of an edge feature point according to the present disclosure, the movement of the target face may also be judged by comparing the relative position relation of the same edge feature point in the pictures of two neighboring frames in the video stream. By doing this, the problem of how to determine the movement state of the user by using the extracted face information when the face in the video stream is always in the movement state can be solved. It is particularly described below by referring to the fourth embodiment.

Figure 4:
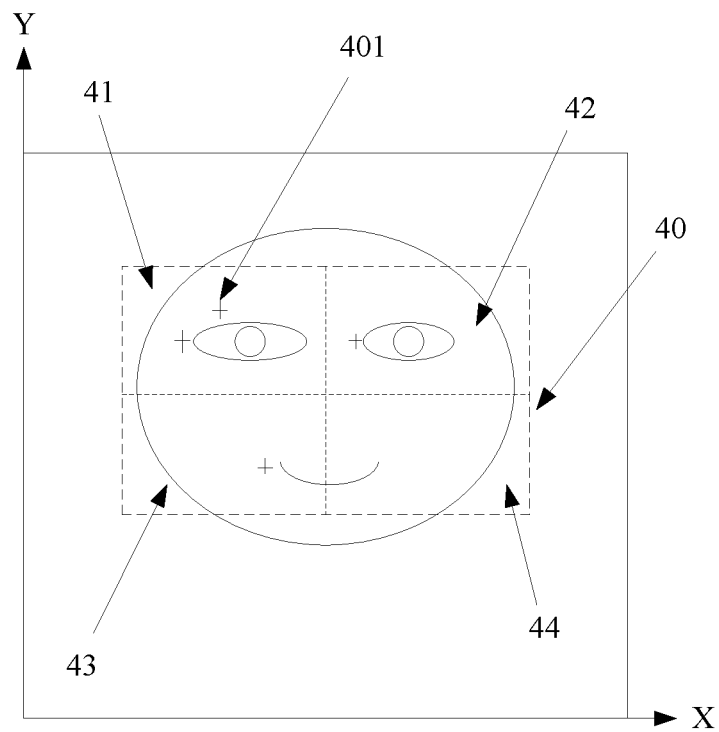
FIG. 4 is a schematic diagram of a window to be tracked and edge feature points of a target face according to an embodiment of the present disclosure.

FIG. 4 is a schematic diagram of a window to be tracked and edge feature points of a target face according to an embodiment of the present disclosure. Referring to FIG. 4, the movement of the target face is mainly embodied as inclining and turning. In the case of inclining, the movement state can be obtained by the displacement of the edge feature points, and when the face is inclining leftward or rightward, the window to be tracked W (namely, the rectangular box 40 that contains a face in FIG. 4) will incline accordingly. At this point, the direction and magnitude of the inclining of the face can be obtained according to the coordinates of the four corner points of the rectangular box (corner points refer to points that have fierce brightness variation in the two-dimensional image or points that have the maximal value of the curvature on the image edge curve, and these points reserve important features of the image).

However, the case of turning is more complicated. The turning of face mainly comprises four directions: upward, downward, leftward and rightward, the majority of which is leftward and rightward turnings. In turning, the displacement of edge feature points is mainly embodied as the change of spacing. Therefore, in the present embodiment, face movements are judged according to the relative displacement between edge feature points.

Referring to FIG. 4, it mainly comprises the following implementing steps: regarding the current frame and the reference frame, projecting each of the edge feature points of the target face to a plane parallel to the target face respectively, and monitoring spacings between each of the edge feature points; if compared with the spacings of the edge feature points in the reference frame, in the current frame the spacings of the edge feature point of a left side face increases and the spacings of the edge feature point of a right side face decreases, determining that the target face is turning to the right; if compared with the spacings of the edge feature points in the reference frame, in the current frame the spacings of the edge feature point of a left side face decreases and the spacings of the edge feature point of a right side face increases, determining that the target face is turning to the left; if compared with the spacings of the edge feature points in the reference frame, in the current frame the spacings of the edge feature point of an upper half face increases and the spacings of the edge feature point of a lower half face decreases, determining that the target face is lifting; and if compared with the spacings of the edge feature points in the reference frame, in the current frame the spacings of the edge feature point of an upper half face decreases and the spacings of the edge feature point of a lower half face increases, determining that the target face is dropping.

As shown in FIG. 4, in a selected human face region rectangular box, it is divided into four regions 41, 42, 43 and 44 with the intersection point of the diagonal lines as the midpoint in a selected face region rectangular box, to establish a corresponding plane coordinate system comprising four regions 41, 42, 43 and 44. The edge feature points in the window to be tracked are projected to the plane coordinate system, to obtain horizontal coordinate values and vertical coordinate values corresponding to each of the edge feature points 401. Each of the points in the face in FIG. 4 is projected to the plane coordinate system comprising the four regions, to obtain the coordinates of each of the points in the face, and when the face is turning, the coordinates will change. Particularly, the four regions are formed by dividing with a midpoint, wherein the midpoint is the intersection point of the diagonal lines of a graph of the windows to be tracked of each frame image, and include: a first region 41, a second region 42, a third region 43 and a fourth region 44. Horizontal ordinate values of the edge feature points in the first region and the third region are less than or equal to horizontal ordinate values of the edge feature points in the second region and the fourth region. Vertical coordinate values of the edge feature points in the third region and the fourth region are less than or equal to vertical coordinate values of the edge feature points in the first region and the second region.

The edge feature points projected to the first region and the third region are arranged in an ascending order of the horizontal ordinates X to obtain a matrix $[x^l]_k^t$. The edge feature points projected to the second region and the fourth region are arranged in an ascending order of the horizontal ordinates X to obtain a matrix $[x^r]_k^t$.

The edge feature points projected to the first region and the second region are arranged in an ascending order of the vertical coordinate values Y to obtain a matrix $[x^u]_k^t$. The edge feature points projected to the third region and the fourth region are arranged in an ascending order of the vertical coordinate value to obtain a matrix $[x^d]_k^t$.

When judging leftward or rightward turning, $[x^l]_k^t$ and $[x^r]_k^t$ are calculated; when judging lifting or dropping movement, the matrixes $[x^u]_k^t$ and $[x^d]_k^t$ are calculated. When judging leftward or rightward turning, the mappings $[\hat{d}_{xl}]$ and $[\hat{d}_{xr}]$ of the spacings of two neighboring edge feature points of the matrixes $[x^l]_k^t$ and $[x^r]_k^t$ on the x axis are obtained respectively, and they are subtracted by the spacings in the preceding frame (namely, the reference frame). When all of the projections of the distances between all of the feature points of the first region and the third region on the x axis decrease and all of the projections of the distances between all of the feature points of the second region and the fourth region on the x axis increase, it is determined that the target is turning to the right. When all of the projections of the distances between all of the feature points of the second region and the fourth region on the x axis decrease and all of the projections of the distances between all of the feature points of the first region and the third region on the x axis increase, it is determined that the target is turning to the left.

Particularly, spacings between each two neighboring elements in the matrixes $[x^l]_k^t$ and $[x^r]_k^t$ are calculated respectively to obtain corresponding spacing matrixes $\lfloor \hat{d}_{xl} \rfloor$ and $\lfloor \hat{d}_{xr} \rfloor$, differences between each element in the spacing matrixes $\lfloor \hat{d}_{xl} \rfloor$ and $\lfloor \hat{d}_{xr} \rfloor$ of the current frame and each element in the spacing matrixes of the reference frame are obtained in sequence, and a left turning movement or a right turning movement of the target face is judged according to the calculating result; spacings between each two neighboring elements in the matrixes $[x^u]_k^t$ and $[x^d]_k^t$ are calculated respectively to obtain corresponding spacing matrixes $\lfloor \hat{d}_{yu} \rfloor$ and $\lfloor \hat{d}_{yd} \rfloor$, differences between each element in the spacing matrixes $\lfloor \hat{d}_{yu} \rfloor$ and $\lfloor \hat{d}_{yd} \rfloor$ of the current frame and each element in the spacing matrixes of the reference frame are obtained in sequence, and a lifting movement or a dropping movement of the target face is judged according to the calculating result.

When the calculating result satisfies the following formulas (1) and (2), it is determined that the target face is turning to the right;

$$[\hat{d}_{xl}^t] - [\hat{d}_{xl}^{t-1}] > 0 \qquad \text{Formula (1)}$$

$$[\hat{d}_{xr}^t] - [\hat{d}_{xr}^{t-1}] < 0 \qquad \text{Formula (2)}$$

where $[\hat{d}_{xl}^t]$ represents a spacing matrix of the edge feature points of the left side face of the current frame, $[\hat{d}_{xl}^{t-1}]$ represents a spacing matrix $\lfloor \hat{d}_{xl} \rfloor$ of the edge feature points of the left side face of the reference frame, $[\hat{d}_{xr}^t]$ represents a spacing matrix of the edge feature points of the right side face of the current frame, and $[\hat{d}_{xr}^{t-1}]$ represents a spacing matrix of the edge feature points of the right side face of the reference frame.

When the calculating result satisfies the following formulas (3) and (4), it is determined that the target face is turning to the left:

$$[\hat{d}_{xl}^t] - [\hat{d}_{xl}^{t-1}] < 0 \qquad \text{Formula (3)}$$

$$[\hat{d}_{xr}^t] - [\hat{d}_{xr}^{t-1}] < 0 \qquad \text{Formula (4)}$$

where $[\hat{d}_{xl}^t]$ represents a spacing matrix of the edge feature points of the left side face of the current frame, $[\hat{d}_{xl}^{t-1}]$ represents a spacing matrix $\lfloor \hat{d}_{xl} \rfloor$ of the edge feature points of the left side face of the reference frame, $[\hat{d}_{xr}^t]$ represents a spacing matrix of the edge feature points of the right side face of the current frame, and $[\hat{d}_{xr}^{t-1}]$ represents a spacing matrix of the edge feature points of the right side face of the reference frame.

The step of judging a lifting movement or a dropping movement of the target face according to the calculating result is as follows.

When the calculating result satisfies the following formulas (5) and (6), it is determined that the target face is lifting:

$$[\hat{d}_{yu}^t] - [\hat{d}_{yu}^{t-1}] > 0 \qquad \text{Formula (5)}$$

$$[\hat{d}_{yd}^t] - [\hat{d}_{yd}^{t-1}] < 0 \qquad \text{Formula (6)}$$

where $[\hat{d}_{yu}^t]$ represents a spacing matrix $\lfloor \hat{d}_{yu} \rfloor$ of the edge feature points of the upper half face of the current frame, $[\hat{d}_{yu}^{t-1}]$ represents a spacing matrix $\lfloor \hat{d}_{yu} \rfloor$ of the edge feature points of the upper half face of the reference frame, $[\hat{d}_{yd}^t]$ represents a spacing matrix $\lfloor \hat{d}_{yd} \rfloor$ of the edge feature points of the lower half face of the current frame, and $[\hat{d}_{yd}^{t-1}]$ represents a spacing matrix $\lfloor \hat{d}_{yd} \rfloor$ of the edge feature points of the lower half face of the reference frame.

When the calculating result satisfies the following formulas (7) and (8), it is determined that the target face is dropping:

$$[\hat{d}_{yu}^t] - [\hat{d}_{yu}^{t-1}] < 0 \qquad \text{Formula (7)}$$

$$[\hat{d}_{yd}^t] - [\hat{d}_{yd}^{t-1}] > 0 \qquad \text{Formula (8)}$$

where $[\hat{d}_{yu}^t]$ represents a spacing matrix $\lfloor \hat{d}_{yu} \rfloor$ of the edge feature points of the upper half face of the current frame, $[\hat{d}_{yu}^{t-1}]$ represents a spacing matrix $\lfloor \hat{d}_{yu} \rfloor$ of the edge feature points of the upper half face of the reference frame, $[\hat{d}_{yd}^t]$ represents a spacing matrix $\lfloor \hat{d}_{yd} \rfloor$ of the edge feature points of the lower half face of the current frame, and $[\hat{d}_{yd}^{t-1}]$ represents a spacing matrix $\lfloor \hat{d}_{yd} \rfloor$ of the edge feature points of the lower half face of the reference frame.

It can be known from the above description that, in the present embodiment, regarding the problem of how to track in real time in the process of face tracking when the face in the video stream is always in the movement state, the movement state of the target is judged by judging the movement actions of the target face by the spacing variation of the edge feature points in the window to be tracked in the reference frame and the current frame, while ensuring the correctness and accuracy of face tracking.

Fifth Embodiment

Figure 5:
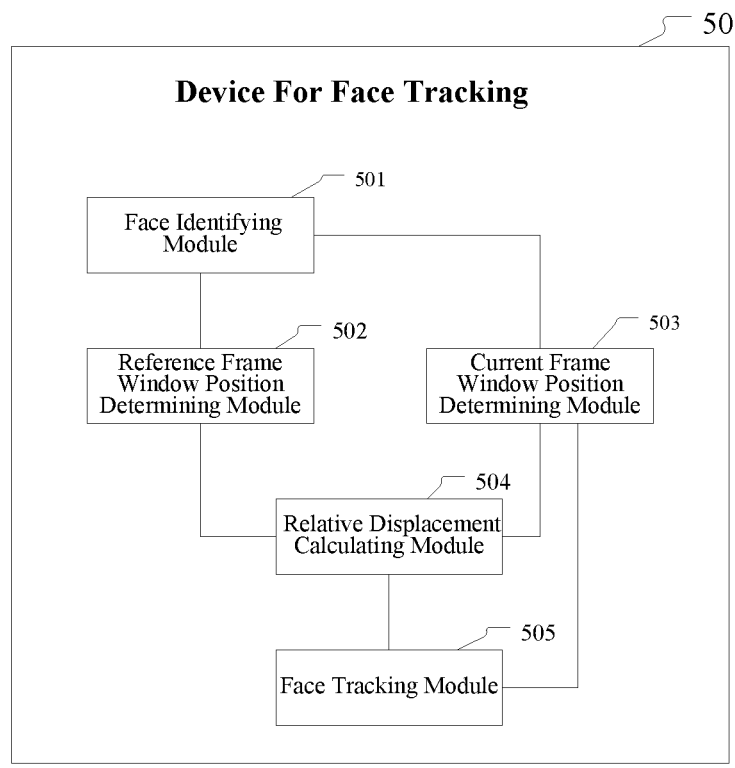
FIG. 5 is a structural block diagram of a device for face tracking according to an embodiment of the present disclosure.

FIG. 5 is a structural block diagram of the device for face tracking according to an embodiment of the present disclosure. Referring to FIG. 5, the device for face tracking 50 comprises:

a face identifying module 501, for collecting a frame of image in a video stream as a reference frame and conducting face detection and face identification to the reference frame, to identify out a target face;

a reference frame window position determining module 502, for determining a position of a window to be tracked that contains the target face in the reference frame according to the identified target face, and extracting an edge feature point in the window to be tracked of the reference frame;

a current frame window position determining module 503, for determining an initial position of a window to be tracked on a current frame image in the video stream according to the position of the window to be tracked of the reference frame, and extracting an edge feature point in the window to be tracked of the current frame;

a relative displacement calculating module 504, for calculating a relative displacement between the edge feature point of the reference frame and the edge feature point of the current frame; and a face tracking module 505, for adjusting the initial position of the window to be tracked of the current frame by using the relative displacement, and obtaining a movement trajectory of the target face in the video stream, to realize face tracking.

In the present embodiment, the device 50 further comprises a tracking and verifying module and a face movement judging module;

the tracking and verifying module is for, after adjusting the initial position of the window to be tracked of the current frame by using the relative displacement, verifying each of edge feature points in the adjusted window to be tracked of the current frame; when the verifying succeeds, confirming that this edge feature point is successfully tracked in the current frame, and continuously tracking this edge feature point in a subsequent tracking process; and when the verifying fails, confirming that this tracking of the edge feature point in the current frame fails, abandoning the edge feature point, and no longer tracking this edge feature point; and the face movement judging module is for, determining a left or right turning movement and a lifting or dropping movement of the target face by using a change of a spacing between the edge feature point in the window to be tracked of the reference frame and the edge feature point in the window to be tracked of the current frame; and calculating an inclination angle of the target face by using the relative displacement of the edge feature point between the reference frame and the current frame, and determining an inclining movement of the target face by the inclination angle.

In the present embodiment, the tracking and verifying module is particularly for: using a position of the edge feature point in the window to be tracked of the current frame as a verification starting position;

determining the window to be tracked of the edge feature point in the reference frame, by using the verification starting position and the relative displacement between the edge feature points of the current frame and of the reference frame, and searching the edge feature point within the window to be tracked in the reference frame, to obtain a position of the edge feature point in the reference frame; and comparing the position of the verified edge feature point in the reference frame by verifying and the position of the edge feature point in the reference frame image which is acquired in advance, wherein if the comparison result is consistent, the verifying succeeds; and if the comparison result is not consistent, the verifying fails.

In the present embodiment, the face movement judging module is particularly for, regarding the current frame and the reference frame, projecting each of the edge feature points of the target face to a plane parallel to the target face respectively, and monitoring spacings between the edge feature points separately; if compared with the spacings of the edge feature points in the reference frame, the spacings of the edge feature point of a left side face in the current frame increases and the spacings of the edge feature point of a right side face decreases, determining that the target face is turning to the right; if compared with the spacings of the edge feature points in the reference frame, the spacings of the edge feature point of a left side face in the current frame decreases and the spacings of the edge feature point of a right side face increases, determining that the target face is turning to the left; if compared with the spacings of the edge feature points in the reference frame, the spacings of the edge feature point of an upper half face in the current frame increases and the spacings of the edge feature point of a lower half face decreases, determining that the target face is lifting; and if compared with the spacings of the edge feature points in the reference frame, the spacings of the edge feature point of an upper half face in the current frame decreases and the spacings of the edge feature point of a lower half face increases, determining that the target face is dropping.

According to the windows to be tracked of the current frame and the reference frame, establishing a corresponding plane coordinate system comprising four regions, and projecting the edge feature points in the window to be tracked to the plane coordinate system, to obtain horizontal coordinate values and vertical coordinate values corresponding to each of the edge feature points. Particularly, the four regions are formed by dividing with the intersection point of the diagonal lines of a graph of the windows to be tracked of each frame image as the midpoint, and include: a first region, a second region, a third region and a fourth region. Horizontal ordinate values of the edge feature points in the first region and the third region are less than or equal to horizontal ordinate values of the edge feature points in the second region and the fourth region. Vertical coordinate values of the edge feature points in the third region and the fourth region are less than or equal to vertical coordinate values of the edge feature points in the first region and the second region.

The edge feature points projected to the first region and the third region are arranged in an ascending order of the horizontal ordinates X to obtain a matrix $[x]_i$. The edge feature points projected to the second region and the fourth region are arranged in an ascending order of the horizontal ordinates X to obtain a matrix $[x']_i$.

The edge feature points projected to the first region and the second region are arranged in an ascending order of the vertical coordinate values Y to obtain a matrix $[x_u]_i$. The edge feature points projected to the third region and the fourth region are arranged in an ascending order of the vertical coordinate value to obtain a matrix $[x_d]_i$.

Spacings between each two neighboring elements in the matrixes $[x]_i$ and $[x']_i$ are calculated respectively to obtain corresponding spacing matrixes $\lfloor \hat{d}_{xl} \rfloor$ and $\lfloor \hat{d}_{xr} \rfloor$, differences between each element in the spacing matrixes $\lfloor \hat{d}_{xl} \rfloor$ and $\lfloor \hat{d}_{xr} \rfloor$ of the current frame and each element in the spacing matrixes of the reference frame are obtained in sequence, and a left turning movement or a right turning movement of the target face is judged according to the calculating result.

Spacings between each two neighboring elements in the matrixes $\lfloor x_u \rfloor_t$ and $\lfloor x_d \rfloor_t$ are calculated respectively to obtain corresponding spacing matrixes $\lfloor \hat{d}_{yu} \rfloor$ and $\lfloor \hat{d}_{yd} \rfloor$, differences between each element in the spacing matrixes $\lfloor \hat{d}_{yu} \rfloor$ and $\lfloor \hat{d}_{yd} \rfloor$ of the current frame and each element in the spacing matrixes of the reference frame are obtained in sequence, and a lifting movement or a dropping movement of the target face is judged according to the calculating result.

When the calculating result satisfies the following formulas (1) and (2), it is determined that the target face is turning to the right:

$$[\hat{d}_{xl}^t]-[\hat{d}_{xl}^{t-1}]>0 \qquad \text{Formula (1)}$$

$$[\hat{d}_{xr}^t]-[\hat{d}_{xr}^{t-1}]<0 \qquad \text{Formula (2)}$$

where $[\hat{d}_{xl}^t]$ represents a spacing matrix of the edge feature points of the left side face of the current frame, $[\hat{d}_{xl}^{t-1}]$ represents a spacing matrix $\lfloor \hat{d}_{xl} \rfloor$ of the edge feature points of the left side face of the reference frame, $[\hat{d}_{xr}^t]$ represents a spacing matrix of the edge feature points of the right side face of the current frame, and $[\hat{d}_{xr}^{t-1}]$ represents a spacing matrix of the edge feature points of the right side face of the reference frame.

When the calculating result satisfies the following formulas (3) and (4), it is determined that the target face is turning to the left:

$$[\hat{d}_{xl}^t]-[\hat{d}_{xl}^{t-1}]<0 \qquad \text{Formula (3)}$$

$$[\hat{d}_{xr}^t]-[\hat{d}_{xr}^{t-1}]<0 \qquad \text{Formula (4)}$$

where $[\hat{d}_{xl}^t]$ represents a spacing matrix of the edge feature points of the left side face of the current frame, $[\hat{d}_{xl}^{t-1}]$ represents a spacing matrix $\lfloor \hat{d}_{xl} \rfloor$ of the edge feature points of the left side face of the reference frame, $[\hat{d}_{xr}^t]$ represents a spacing matrix of the edge feature points of the right side face of the current frame, and $[\hat{d}_{xr}^{t-1}]$ represents a spacing matrix of the edge feature points of the right side face of the reference frame;

The step of judging a lifting movement or a dropping movement of the target face according to the calculating result is as follows.

When the calculating result satisfies the following formulas (5) and (6), it is determined that the target face is lifting:

$$[\hat{d}_{yu}^t]-[\hat{d}_{yu}^{t-1}]>0 \qquad \text{Formula (5)}$$

$$[\hat{d}_{yd}^t]-[\hat{d}_{yd}^{t-1}]<0 \qquad \text{Formula (6)}$$

where $[\hat{d}_{yu}^t]$ represents a spacing matrix $\lfloor \hat{d}_{yu} \rfloor$ of the edge feature points of the upper half face of the current frame, $[\hat{d}_{yu}^{t-1}]$ represents a spacing matrix $\lfloor \hat{d}_{yu} \rfloor$ of the edge feature points of the upper half face of the reference frame, $[\hat{d}_{yd}^t]$ represents a spacing matrix $\lfloor \hat{d}_{yd} \rfloor$ of the edge feature points of the lower half face of the current frame, and $[\hat{d}_{yd}^{t-1}]$ represents a spacing matrix $\lfloor \hat{d}_{yd} \rfloor$ of the edge feature points of the lower half face of the reference frame.

When the calculating result satisfies the following formulas (7) and (8), it is determined that the target face is dropping:

$$[\hat{d}_{yu}^t]-[\hat{d}_{yu}^{t-1}]<0 \qquad \text{Formula (7)}$$

$$[\hat{d}_{yd}^t]-[\hat{d}_{yd}^{t-1}]>0 \qquad \text{Formula (8)}$$

where $[\hat{d}_{yu}^t]$ represents a spacing matrix $\lfloor \hat{d}_{yu} \rfloor$ of the edge feature points of the upper half face of the current frame, $[\hat{d}_{yu}^{t-1}]$ represents a spacing matrix $\lfloor \hat{d}_{yu} \rfloor$ of the edge feature points of the upper half face of the reference frame, $[\hat{d}_{yd}^t]$ represents a spacing matrix $\lfloor \hat{d}_{yd} \rfloor$ of the edge feature points of the lower half face of the current frame, and $[\hat{d}_{yd}^{t-1}]$ a represents a spacing matrix $\lfloor \hat{d}_{yd} \rfloor$ of the edge feature points of the lower half face of the reference frame.

Thereby, the detection of the movements of the target face in the video stream is realized.

In the present embodiment, the face identifying module 501 is particularly for collecting a frame of image in a video stream and converting into a grayscale image, and extracting a Haar-like feature value of the grayscale image; selecting the Haar-like feature values of the grayscale image by using an Adaboost cascade classifier that has been trained, and detecting the grayscale image by using the selected Haar-like feature values to obtain an initial face region; conducting skin color distinguishing to the initial face region by using an established skin color model, to obtain a standard face region; extracting a face feature from the standard face region by using a preset Gabor filter; and sending the face feature extracted by the Gabor filter to a support vector machine SVM that has been trained to conduct matching and identifying, to identify the target face.

It should be noted that, the device for face tracking in the present embodiment is corresponding to the above method for face tracking. Therefore, the working process of the device for face tracking may be referred to in the relative description in the embodiments of the method for face tracking of the present disclosure, which is not repeated here.

Sixth Embodiment

Figure 6:
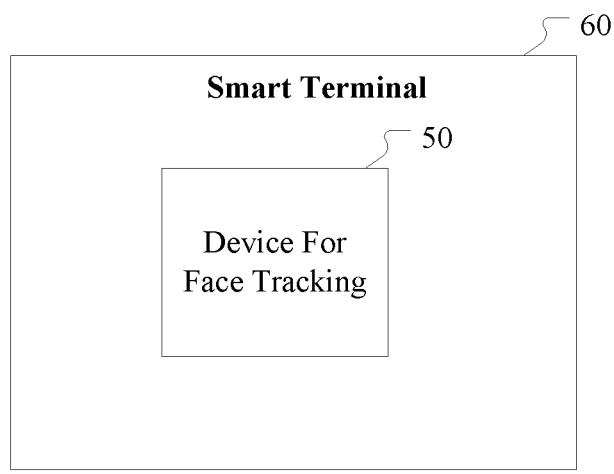
FIG. 6 is a structural block diagram of a smart terminal according to an embodiment of the present disclosure.

FIG. 6 is a structural block diagram of a smart terminal according to an embodiment of the present disclosure. Referring to FIG. 6, the smart terminal 60 of the present embodiment comprises the device for face tracking 50 shown in the fifth embodiment. The smart terminal 60 detects the face movement state using the device for face tracking 50, and self-adaptively adjusts the positions of at least part of the movable components (for example, turning the position of the display screen) or the functions executed by at least part of the components (for example, turning on or turning off the functions of some applications in the terminal) according to the detected face movement state.

Generally, when the face is lifting or dropping, the positions (or orientations) of the movable components of the smart terminal need not to be moved, but when the face is turning to the left or right, the positions of the movable components of the smart terminal may need to be moved. In the present embodiment, since the smart terminal 60 comprises the device for face tracking, after the system of the smart terminal 60 determines that there is a face turning movement, when it is detected that one movement of the face terminates, the positions of the movable components of the smart terminal are adjusted, so that the smart terminal follows the movements of the face, which is more humanized.

In the present embodiment, the smart terminal 60 calculates the difference value between the adjacent moment t and moment t−1 of the spacing matrixes of the edge feature point of the left side face or the right side face of the current frame, and when $\lfloor \hat{d}_{xl}^t \rfloor - \lfloor \hat{d}_{xl}^{t-1} \rfloor \approx 0$ or $\lfloor \hat{d}_{xr}^t \rfloor - \lfloor \hat{d}_{xr}^{t-1} \rfloor \approx 0$, it is determined that the face turning movement nearly terminates, and the threshold is 0. At this point, the positions of the movable components of the smart terminal are controlled to be translated in the turning direction by π/4 radians. After the movable components of the smart terminal 60 move, the image background in the video stream changes accordingly, so the image is subject to face detection again. Accordingly, the smart terminal tracks the movement of the face by using the device for face tracking, so as to realize uninterrupted tracking of the same person, which improves the ability of man-machine interaction of the smart terminal.

In the present embodiment, the smart terminal 60 may be a terminal device that detects body activities, for example, an intelligent robot, and then the intelligent robot performs corresponding cooperative operations according to the detected body movements of the target face, which improves the man-machine interaction performance of the intelligent robot and optimizes the user experience.

In conclusion, compared with the existing methods for face tracking such as those based on skin color model algorithm, the method and device for face tracking of the present disclosure have the following advantageous effects. First, the problem of background color interference is overcome, which improves the correctness of face tracking. Second, the information such as the gesture and the movement direction of the face are deduced backward by using the relative position relation between the edge feature points separately, which facilitates man-machine interaction. Finally, regarding the problem in the movement process that features may be blocked to result in incorrect tracking, time reverse verification is used, which overcomes the problem of failed tracking resulted by the misjudgment of the edge feature points. In addition, the smart terminal of the present disclosure comprises the device for face tracking, and when the target face is moving, the smart terminal can automatically follow and realize the effect of discontinuous tracking, which optimizes the man-machine interaction experience and improves the competitiveness of product.

The above description is merely preferable embodiments of the present disclosure, and is not intended to limit the protection scope of the present disclosure. Any modifications, equivalent substitutions or improvements made within the spirit and principle of the present disclosure shall all be included in the protection scope of the present disclosure.

What is claimed is:

1. A method for face tracking, comprising:
collecting a frame of image in a video stream as a reference frame, and conducting face detection and face identification with respect to the reference frame, to identify out a target face;
determining a position of a window to be tracked that contains the target face in the reference frame according to the identified target face, and extracting an edge feature point in the window to be tracked of the reference frame;
determining an initial position of a window to be tracked on a current frame image in the video stream according to the position of the window to be tracked of the reference frame, and extracting an edge feature point in the window to be tracked of the current frame;
calculating a relative displacement between the edge feature point of the reference frame and the edge feature point of the current frame; and
adjusting the initial position of the window to be tracked of the current frame by using the relative displacement, and obtaining a movement trajectory of the target face in the video stream, to realize face tracking;

wherein after the step of adjusting the initial position of the window to be tracked of the current frame by using the relative displacement, the method further comprises:
verifying each of edge feature points in the adjusted window to be tracked of the current frame;
when the verifying succeeds, confirming that this edge feature point is successfully tracked in the current frame, and continuously tracking this edge feature point in a subsequent tracking process; and
when the verifying fails, confirming that this tracking of the edge feature point in the current frame fails, abandoning the edge feature point, and no longer tracking this edge feature point.

2. The method according to claim 1, wherein the step of verifying each of edge feature points in the adjusted window to be tracked of the current frame comprises:
using a position of the edge feature point in the window to be tracked of the current frame as a verification starting position;
determining the window to be tracked of the edge feature point in the reference frame, by using the verification starting position and the relative displacement between the edge feature points of the current frame and of the reference frame, and searching the edge feature point within the window to be tracked in the reference frame, to obtain a position of the edge feature point in the reference frame; and
comparing the position of the verified edge feature point in the reference frame and the position of the edge feature point in the reference frame image which is acquired in advance, wherein if the comparison result is consistent, the verifying succeeds; and if the comparison result is not consistent, the verifying fails.

3. The method according to claim 1, further comprising:
determining a left or right turning movement and a lifting or dropping movement of the target face by using a change of a spacing between the edge feature point in the window to be tracked of the reference frame and the edge feature point in the window to be tracked of the current frame; and
calculating an inclination angle of the target face by using the relative displacement of the edge feature points between the reference frame and the current frame, and determining an inclining movement of the target face by the inclination angle.

4. The method according to claim 3, wherein the step of determining a left or right turning movement and a lifting or dropping movement of the target face by using a change of a spacing between the edge feature point in the window to be tracked of the reference frame and the edge feature point in the window to be tracked of the current frame, comprises:
regarding the current frame and the reference frame, projecting each of the edge feature points of the target face to a plane parallel to the target face respectively, and monitoring spacings between the edge feature points separately;
if compared with the spacings of the edge feature points in the reference frame, in the current frame the spacings of the edge feature point of a left side face increases and the spacings of the edge feature point of a right side face decreases, determining that the target face is turning to the right;
if compared with the spacings of the edge feature points in the reference frame, in the current frame the spacings of the edge feature point of a left side face decreases and the spacings of the edge feature point of a right side face increases, determining that the target face is turning to the left;

if compared with the spacings of the edge feature points in the reference frame, in the current frame the spacings of the edge feature point of an upper half face increases and the spacings of the edge feature point of a lower half face decreases, determining that the target face is lifting; and if compared with the spacings of the edge feature points in the reference frame, in the current frame the spacings of the edge feature point of an upper half face decreases and the spacings of the edge feature point of a lower half face increases, determining that the target face is dropping.

5. The method according to claim 4, wherein the step of regarding the current frame and the reference frame, projecting each of the edge feature points of the target face to a plane parallel to the target face respectively, and monitoring spacings between the edge feature points separately comprises:

establishing a corresponding plane coordinate system comprising four regions according to the windows to be tracked of the current frame and the reference frame respectively, and projecting the edge feature points in the window to be tracked to the plane coordinate system, to obtain horizontal coordinate values and vertical coordinate values corresponding to each of the edge feature points;

wherein the four regions are formed by dividing with the intersection point of the diagonal lines of a graph of the windows to be tracked of each frame image as the midpoint, and include: a first region, a second region, a third region and a fourth region, horizontal ordinate values of the edge feature points in the first region and the third region are less than or equal to horizontal ordinate values of the edge feature points in the second region and the fourth region, and vertical coordinate values of the edge feature points in the third region and the fourth region are less than or equal to vertical coordinate values of the edge feature points in the first region and the second region;

arranging the edge feature points projected to the first region and the third region in an ascending order of the horizontal ordinate values to obtain a matrix $[x_l]$, and arranging the edge feature points projected to the second region and the fourth region in an ascending order of the horizontal ordinate values to obtain a matrix $[x_r]$;

arranging the edge feature points projected to the first region and the second region in an ascending order of the vertical coordinate values to obtain a matrix $[x_u]$, and arranging the edge feature points projected to the third region and the fourth region in an ascending order of the vertical coordinate values to obtain a matrix $[x_d]$;

calculating spacings between each two neighboring elements in the matrixes $[x_l]$ and $[x_r]$ respectively to obtain corresponding spacing matrixes $\lfloor\hat{d}_{xl}\rfloor$ and $\lfloor\hat{d}_{xr}\rfloor$, calculating, in sequence, differences between each element in the spacing matrixes $\lfloor\hat{d}_{xl}\rfloor$ and $\lfloor\hat{d}_{xr}\rfloor$ of the current frame and each element in the spacing matrixes of the reference frame, and judging a left turning movement or a right turning movement of the target face according to the calculating result; and calculating spacings between each two neighboring elements in the matrixes $[x_u]$ and $[x_d]$ respectively to obtain corresponding spacing matrixes $\lfloor\hat{d}_{yu}\rfloor$ and $\lfloor\hat{d}_{yd}\rfloor$, calculating, in sequence, differences between each element in the spacing matrixes $\lfloor\hat{d}_{yu}\rfloor$ and $\lfloor\hat{d}_{yd}\rfloor$ of the current frame and each element in the spacing matrixes of the reference frame, and judging a lifting movement or a dropping movement of the target face according to the calculating result.

6. The method according to claim 5, wherein the step of judging a left turning movement or a right turning movement of the target face according to the calculating result comprises:

when the calculating result satisfies the following formulas (1) and (2), determining that the target face is turning to the right;

$$[\hat{d}_{xl}^t]-[\hat{d}_{xl}^{t-1}]>0 \qquad \text{Formula (1)}$$

$$[\hat{d}_{xr}^t]-[\hat{d}_{xr}^{t-1}]<0 \qquad \text{Formula (2)}$$

where $[\hat{d}_{xl}^t]$ represents a spacing matrix of the edge feature points of the left side face of the current frame, $[\hat{d}_{xl}^{t-1}]$ represents a spacing matrix $\lfloor\hat{d}_{xl}\rfloor$ of the edge feature points of the left side face of the reference frame, $[\hat{d}_{xr}^t]$ represents a spacing matrix of the edge feature points of the right side face of the current frame, and $[\hat{d}_{xr}^{t-1}]$ represents a spacing matrix of the edge feature points of the right side face of the reference frame; and when the calculating result satisfies the following formulas (3) and (4), determining that the target face is turning to the left:

$$[\hat{d}_{xl}^t]-[\hat{d}_{xl}^{t-1}]<0 \qquad \text{Formula (3)}$$

$$[\hat{d}_{xr}^t]-[\hat{d}_{xr}^{t-1}]<0 \qquad \text{Formula (4)}$$

where $[\hat{d}_{xl}^t]$ represents a spacing matrix of the edge feature points of the left side face of the current frame, $[\hat{d}_{xl}^{t-1}]$ represents a spacing matrix $\lfloor\hat{d}_{xl}\rfloor$ of the edge feature points of the left side face of the reference frame, $[\hat{d}_{xr}^t]$ represents a spacing matrix of the edge feature points of the right side face of the current frame, and $[\hat{d}_{xr}^{t-1}]$ represents a spacing matrix of the edge feature points of the right side face of the reference frame; and the step of judging a lifting movement or a dropping movement of the target face according to the calculating result comprises:

when the calculating result satisfies the following formulas (5) and (6), determining that the target face is lifting:

$$[\hat{d}_{yu}^t]-[\hat{d}_{yu}^{t-1}]>0 \qquad \text{Formula (5)}$$

$$[\hat{d}_{yd}^t]-[\hat{d}_{yd}^{t-1}]<0 \qquad \text{Formula (6)}$$

where $[\hat{d}_{yu}^t]$ represents a spacing matrix $\lfloor\hat{d}_{yu}\rfloor$ of the edge feature points of the upper half face of the current frame, $[\hat{d}y u^{t-1}]$ represents a spacing matrix $\lfloor\hat{d}_{yu}\rfloor$ of the edge feature points of the upper half face of the reference frame, $[\hat{d}_{yd}^t]$ represents a spacing matrix $\lfloor\hat{d}_{yd}\rfloor$ of the edge feature points of the lower half face of the current frame, and $[\hat{d}_{yd}^{t-1}]$ represents a spacing matrix $\lfloor\hat{d}_{yd}\rfloor$ of the edge feature points of the lower half face of the reference frame; and when the calculating result satisfies the following formulas (7) and (8), determining that the target face is dropping:

$$[\hat{d}_{yu}^t]-[\hat{d}_{yu}^{t-1}]<0 \qquad \text{Formula (7)}$$

$$[\hat{d}_{yd}^t]-[\hat{d}_{yd}^{t-1}]>0 \qquad \text{Formula (8)}$$

where $[\hat{d}_{yu}{}^t]$ represents a spacing matrix $\lfloor\hat{d}_{yu}\rfloor$ of the edge feature points of the upper half face of the current frame, $[\hat{d}_{yu}{}^{t-1}]$ represents a spacing matrix $\lfloor\hat{d}_{yu}\rfloor$ of the edge feature points of the upper half face of the reference frame, $[\hat{d}_{yd}{}^t]$ represents a spacing matrix $\lfloor\hat{d}_{yd}\rfloor$ of the edge feature points of the lower half face of the current frame, and $[\hat{d}_{yd}{}^{t-1}]$ represents a spacing matrix $\lfloor\hat{d}_{yd}\rfloor$ of the edge feature points of the lower half face of the reference frame.

7. The method according to claim 1, wherein the step of collecting a frame of image in a video stream as a reference frame and conducting face detection and face identification with respect to the reference frame, to identify out a target face comprises:
   collecting a frame of image in a video stream and converting into a grayscale image, and extracting a Haar-like feature value of the grayscale image;
   selecting the Haar-like feature values of the grayscale image by using an Adaboost cascade classifier that has been trained, and detecting the grayscale image by using the selected Haar-like feature values to obtain an initial face region;
   conducting skin color distinguishing to the initial face region by using an established skin color model, to obtain a standard face region;
   extracting a face feature from the standard face region by using a preset Gabor filter; and
   sending the face feature extracted by the Gabor filter to a support vector machine SVM that has been trained to conduct matching and identifying, to identify the target face.

8. A device for face tracking, comprising a processor, wherein the processor is configured to:
   collect a frame of image in a video stream as a reference frame and conduct face detection and face identification with respect to the reference frame, to identify out a target face;
   determine a position of a window to be tracked that contains the target face in the reference frame according to the identified target face, and extracting an edge feature point in the window to be tracked of the reference frame;
   determine an initial position of a window to be tracked on a current frame image in the video stream according to the position of the window to be tracked of the reference frame, and extract an edge feature point in the window to be tracked of the current frame;
   calculate a relative displacement between the edge feature point of the reference frame and the edge feature point of the current frame; and
   adjust the initial position of the window to be tracked of the current frame by using the relative displacement, and obtain a movement trajectory of the target face in the video stream, to realize face tracking;
   wherein the processor is further configured to after adjusting the initial position of the window to be tracked of the current frame by using the relative displacement, verify each of edge feature points in the adjusted window to be tracked of the current frame; and when the verifying succeeds, confirm that this edge feature point is successfully tracked in the current frame, and continuously track this edge feature point in a subsequent tracking process; and when the verifying fails, confirm that this tracking of the edge feature point in the current frame fails, abandon the edge feature point, and no longer track this edge feature point.

9. The device for face tracking according to claim 8, wherein the processor is further configured to:
   use a position of the edge feature point in the window to be tracked of the current frame as a verification starting position;
   determine the window to be tracked of the edge feature point in the reference frame, by using the verification starting position and the relative displacement between the edge feature points of the current frame and of the reference frame, and searching the edge feature point within the window to be tracked in the reference frame, to obtain a position of the edge feature point in the reference frame; and
   compare the position of the verified edge feature point in the reference frame and the position of the edge feature point in the reference frame image which is acquired in advance, wherein if the comparison result is consistent, the verifying succeeds; and if the comparison result is not consistent, the verifying fails.

10. The device for face tracking according to claim 8, wherein the processor is further configured to:
    determine a left or right turning movement and a lifting or dropping movement of the target face by using a change of a spacing between the edge feature point in the window to be tracked of the reference frame and the edge feature point in the window to be tracked of the current frame; and calculate an inclination angle of the target face by using the relative displacement of the edge feature point between the reference frame and the current frame, and determine an inclining movement of the target face by the inclination angle.

11. The device for face tracking according to claim 10, wherein the processor is further configured to determine a left or right turning movement and a lifting or dropping movement of the target face by using a change of a spacing between the edge feature point in the window to be tracked of the reference frame and the edge feature point in the window to be tracked of the current frame, and this function comprises:
    regarding the current frame and the reference frame, projecting each of the edge feature points of the target face to a plane parallel to the target face respectively, and monitoring spacings between the edge feature points separately;
    if compared with the spacings of the edge feature points in the reference frame, in the current frame the spacings of the edge feature point of a left side face increases and the spacings of the edge feature point of a right side face decreases, determining that the target face is turning to the right;
    if compared with the spacings of the edge feature points in the reference frame, in the current frame the spacings of the edge feature point of a left side face decreases and the spacings of the edge feature point of a right side face increases, determining that the target face is turning to the left;
    if compared with the spacings of the edge feature points in the reference frame, in the current frame the spacings of the edge feature point of an upper half face increases and the spacings of the edge feature point of a lower half face decreases, determining that the target face is lifting; and
    if compared with the spacings of the edge feature points in the reference frame, in the current frame the spacings of the edge feature point of an upper half face decreases and the spacings of the edge feature point of a lower half face increases, determining that the target face is dropping.

12. The device for face tracking according to claim 11, wherein the processor is further configured to, regarding the current frame and the reference frame, project each of the edge feature points of the target face to a plane parallel to the target face respectively, and monitor spacings between the edge feature points separately, and this function comprises:

establishing a corresponding plane coordinate system comprising four regions according to the windows to be tracked of the current frame and the reference frame, and projecting the edge feature points in the window to be tracked to the plane coordinate system, to obtain horizontal coordinate values and vertical coordinate values corresponding to each of the edge feature points;

wherein the four regions are formed by dividing with the intersection point of the diagonal lines of a graph of the windows to be tracked of each frame image as the midpoint, and include: a first region, a second region, a third region and a fourth region, horizontal ordinate values of the edge feature points in the first region and the third region are less than or equal to horizontal ordinate values of the edge feature points in the second region and the fourth region, and vertical coordinate values of the edge feature points in the third region and the fourth region are less than or equal to vertical coordinate values of the edge feature points in the first region and the second region;

arranging the edge feature points projected to the first region and the third region in an ascending order of the horizontal ordinate values to obtain a matrix $[x/]_k$, and arranging the edge feature points projected to the second region and the fourth region in an ascending order of the horizontal ordinate values to obtain a matrix $[xr]_k$;

arranging the edge feature points projected to the first region and the second region in an ascending order of the vertical coordinate values to obtain a matrix $[xu]_k$, and arranging the edge feature points projected to the third region and the fourth region in an ascending order of the vertical coordinate values to obtain a matrix $[xd]_k$;

calculating spacings between each two neighboring elements in the matrixes $[x/]_k$ and $[xr]_k$ respectively to obtain corresponding spacing matrixes $\lfloor \hat{d}_{xl} \rfloor$ and $\lfloor \hat{d}_{xr} \rfloor$, calculating, in sequence, differences between each element in the spacing matrixes $\lfloor \hat{d}_{xl} \rfloor$ and $\lfloor \hat{d}_{xr} \rfloor$ of the current frame and each element in the spacing matrixes of the reference frame, and judging a left turning movement or a right turning movement of the target face according to the calculating result; and calculating spacings between each two neighboring elements in the matrixes $[xu]_k$ and $[xd]_k$ respectively to obtain corresponding spacing matrixes $\lfloor \hat{d}_{yu} \rfloor$ and $\lfloor \hat{d}_{yd} \rfloor$, calculating, in sequence, differences between each element in the spacing matrixes $\lfloor \hat{d}_{yu} \rfloor$ and $\lfloor \hat{d}_{yd} \rfloor$ of the current frame and each element in the spacing matrixes of the reference frame, and judging a lifting movement or a dropping movement of the target face according to the calculating result.

13. A smart terminal, wherein the smart terminal comprises the device for face tracking according to claim 8; and the smart terminal is further configured to detect a face movement state by using the device for face tracking, and the smart terminal self-adaptively adjusts positions of at least part of movable components or functions executed by at least part of components according to the detected face movement state.

14. The smart terminal according to claim 13, wherein the device for face tracking is further configured to:

use a position of the edge feature point in the window to be tracked of the current frame as a verification starting position;

determine the window to be tracked of the edge feature point in the reference frame, by using the verification starting position and the relative displacement between the edge feature points of the current frame and of the reference frame, and search the edge feature point within the window to be tracked in the reference frame, to obtain a position of the edge feature point in the reference frame; and compare the position of the verified edge feature point in the reference frame by verifying and the position of the edge feature point in the reference frame image which is acquired in advance, wherein if the comparison result is consistent, the verifying succeeds; and if the comparison result is not consistent, the verifying fails.

15. The smart terminal according to claim 13, wherein the device for face tracking is further configured to determine a left or right turning movement and a lifting or dropping movement of the target face by using a change of a spacing between the edge feature point in the window to be tracked of the reference frame and the edge feature point in the window to be tracked of the current frame; and calculate an inclination angle of the target face by using the relative displacement of the edge feature point between the reference frame and the current frame, and determine an inclining movement of the target face by the inclination angle.

16. The smart terminal according to claim 15, wherein determining a left or right turning movement and a lifting or dropping movement of the target face by using a change of a spacing between the edge feature point in the window to be tracked of the reference frame and the edge feature point in the window to be tracked of the current frame, comprises:

regarding the current frame and the reference frame, respectively projecting each of the edge feature points of the target face to a plane parallel to the target face, and monitoring spacings between the edge feature points separately;

if compared with the spacings of the edge feature points in the reference frame, in the current frame the spacings of the edge feature point of a left side face increases and the spacings of the edge feature point of a right side face decreases, determining that the target face is turning to the right;

if compared with the spacings of the edge feature points in the reference frame, in the current frame the spacings of the edge feature point of a left side face decreases and the spacings of the edge feature point of a right side face increases, determining that the target face is turning to the left;

if compared with the spacings of the edge feature points in the reference frame, in the current frame the spacings of the edge feature point of an upper half face increases and the spacings of the edge feature point of a lower half face decreases, determining that the target face is lifting; and if compared with the spacings of the edge feature points in the reference frame, in the current frame the spacings of the edge feature point of an upper half face decreases and the spacings of the edge feature point of a lower half face increases, determining that the target face is dropping.

17. The smart terminal according to claim 13, wherein the smart terminal self-adaptively adjusts positions of at least part of movable components or functions executed by at least part of components according to the detected face movement state, and this function comprises:

when the face turns, calculating a difference value of the spacing matrixes of the edge feature points in the current frame image at neighboring moments of the left side face or the right side face, and when the difference value is less than a threshold, determining that one turning movement of the face is finished, and the smart terminal, corresponding to the turning movement, self-adaptively adjusts positions of at least part of movable components or functions executed by at least part of components.

* * * * *